US006249507B1

(12) United States Patent
Guerra

(10) Patent No.: US 6,249,507 B1
(45) Date of Patent: Jun. 19, 2001

(54) INFORMATION STORAGE SYSTEMS UTILIZING MEDIA WITH OPTICALLY-DIFFERENTIATED DATA SITES

(76) Inventor: John M. Guerra, 250 Old Marlboro Rd., Concord, MA (US) 01742

( * ) Notice: Subject to any disclaimer, the term of this patent is extended or adjusted under 35 U.S.C. 154(b) by 0 days.

(21) Appl. No.: 09/639,375

(22) Filed: Aug. 15, 2000

Related U.S. Application Data

(63) Continuation of application No. 08/997,906, filed on Dec. 24, 1997, now Pat. No. 6,115,348, which is a continuation-in-part of application No. 08/972,778, filed on Nov. 18, 1997, now Pat. No. 5,910,940.

(51) Int. Cl.[7] ....................................................... G11B 9/00
(52) U.S. Cl. ...................... 369/275.1; 369/285; 369/278
(58) Field of Search ............................. 369/275.1, 275.2, 369/275.3, 275.4, 278, 283, 285

(56) References Cited

U.S. PATENT DOCUMENTS

| 5,172,366 | 12/1992 | Chikuma | 369/120 |
| 5,247,510 | 9/1993 | Lee et al. | 369/112 |
| 5,625,613 | 4/1997 | Kato et al. | 369/112 |
| 5,757,763 | 5/1998 | Green, Jr. et al. | 369/275.3 |
| 5,774,444 | 6/1998 | Shimano et al. | 369/112 |
| 5,870,353 | 2/1999 | Morimoto et al. | 369/275.4 |

FOREIGN PATENT DOCUMENTS 61-189788  *  8/1986  (JP) ................................... 369/275.1

* cited by examiner

*Primary Examiner*—Nabil Hindi
(74) *Attorney, Agent, or Firm*—Van Pelt & Yi LLP; Paul Thyfault

(57) ABSTRACT

Storage density in an optical data storage media and system is increased many times the resolution limit by fully utilizing the much smaller detection limit by differentiating and isolating the active data sites in the media optically. The tracks are preordained and predisposed to a specific optical property and value that is different from that of its "n" nearest neighbors but is identical to its nth neighbor and to the optical properties of the reading and writing optical system.

42 Claims, 11 Drawing Sheets

INFORMATION STORAGE SYSTEMS UTILIZING MEDIA WITH OPTICALLY-DIFFERENTIATED DATA SITES

CROSS REFERENCE TO RELATED APPLICATIONS

This application is a continuation of U.S. patent application Ser. No. 08/997,906 filed Dec. 24, 1997, now U.S. Pat. No. 6,115,348 entitled "Information Storage Systems Utilizing Media With Optically-Differentiated Data Sites" which is a continuation in part of Ser. No. 08/972,778, filed Nov. 18, 1997, now U.S. Pat. No. 5,910,940 entitled: "Storage Medium Having a Layer of Mico-Optical Lenses Each Lens Generating an Evanescent Field."

BACKGROUND OF THE INVENTION

1. Field Of the Invention

This invention in general relates to the field of optical recording systems and media and, in particular, to storage media comprising optically differentiated or discriminated data sites by which means a greater resolution and storage density is attained.

2. Description of the Prior Art

Technical data relevant to the present application can be found in sources such as:

*Optical Physics*, Lipson and Lipson, Cambridge University Press, 1969.

*Optical Materials*, S. Musikant, Marcel Dekker, Inc., New York, 1985. P. 64–76.

Guerra, J. M., Phase Controlled Evanescent Field Systems and Methods for Optical Recording and Retrieval, U.S. Pat. No. 5,754,514, issued May 19, 1998.

Conventional optical storage media commonly use a "land and groove" configuration in which alternating data tracks are separated in height by $\lambda/6$, where $\lambda$ is the illumination wavelength. The purpose of this height differentiation between tracks is to cause destructive interference, or cancellation, of the ringing caused by the coherent illumination, thereby allowing spacing, or track pitch, that is closer to the resolution limit of an incoherently illuminated system. However, the alternating height is usually binary, and does not allow super-resolution (i.e. track separation smaller than the resolution limit of the optical system).

Other examples of differentiated tracks or sites include the red, green, and blue color filter stripes or dot matrix such as found in color television monitors, and similar red, green, and blue color stripes in Polaroid's™ instant color slide film and Polavision™ instant movie film. In both cases, the purpose of the color stiripes was to cause selective local color change from white to black and any shade of color in between by combining one or all of the RGB color elements in various intensity combinations. However, in neither example was the intent or effect to cause super-resolution, nor means for optical data storage in the case of the former.

U.S. Pat. No. 5,910,940 issued Jun. 8, 1999, "Optical Recording Systems and Media with Integral Near-Field Optics" issued to Guerra discloses optical storage media having an integral micro-optical structure to effect higher resolution. In part, the higher resolution results from the larger system numerical aperture tht is obtained by combining the micro-optics in the medium with the drive objective optics. This larger numerical aperture allows the higher spatial frequencies contained in the evanescent, or "near-field," to contribute to the image, thereby increasing resolution and storage density.

SUMMARY OF THE INVENTION

An optical storage media comprising optically differentiated data sites is disclosed, where the data sites are optically isolated or discriminated by additional optical elements in the optical system. The differentiated tracks may be read sequentially by a single head or in parallel wither with multiple objectives or a single objective with a multi-channel filtered detector. In near-field optical recording, tracks may be differentiated by physical height, or phase, or refractive index, such that the returning light is different for neighboring tracks. Accordingly, there is achieved optical storage density much greater than the resolution limit of an optical system by optically isolating and differentiating the active optical sites, said sites made as small as the detection limit of the optical system.

In the present application, the active optical layer comprises micro-optical properties for the increase of resolution and information storage density, primarily for use in, but not limited to, a propagating light non-flying optical data storage system. The micro-optical structures or domains in the optical media optically isolate, discriminate, and differentiate adjacent optical active sites or optical artifacts such that the detection limit, rather than the much larger resolution limit, of the optical data storage system may be fully utilized for higher storage density.

Optical visibility and detection, rather than optical resolution, serve to increase the storage density of optical data systems. Optically-differentiated sites smaller than the resolution limit of an optical system are detected, or made visible, by that system if the sites are separated by more than the resolution limit. Particles as small as 4 nanometers can be seen in normal dark-field microscopes, for example, if those particles are far enough apart. That is to say they must be separated at least by a distance which is equal to or greater than the resolution limit "d," defined as the illumination wavelength $\lambda$ divided by the numerical aperture (N.A.) of the optical system:

$d = \lambda/N.A.$ (or $\lambda/2N.A.$ for oblique illumination),

Where the numerical aperture is a product of the index n of refraction in which the object to be resolved is immersed, and the sine of the half angle $\theta$ subtended by the optical system at the object:

$N.A. = n(\sin \theta)$,

Equation (1) is the well-known resolution limit for a mictoscope as worked out first by Abbe in 1888.

The measured size of the particles will be much larger, on the order of the Airy disc for that system. Whether a particle is $1/10$ or $1/2$ the optical system resolution, the resulting Airy discs will be equivalent in diameter to each other and to the resolution limit. However, the Airy disk for the smaller particle will be less bright. Given enough light for the required signal-to-noise, a particle much smaller than the resolution limit is visible, as long as it is isolated from the nearest particles by at least the resolution limit. Bright-field microscopes, for example, also show particles smaller than their resolution limit, as do near-field microscopes as well.

As disclosed, data tracks comprise a width much smaller than the resolution limit of the optical read/write head objective, and the tracks are spaced closer than the resolution limit of the optics as well. However, each track is differentiated by color, polarization, height, intensity, reflection, absorption, phase, refractive index, geometry (height or slope), or other parameter such that like tracks or sites are many tracks apart and separated by at least or more than the resolution limit.

For ease of illustration, color differentiation is described here, though other ways of differentiation, some mentioned above, may be preferable. Consider red, green and blue alternating optical data tracks, where the track width is $1/6$ and track pitch is $1/3$ the resolution limit of the objective. If a single unfiltered objective is used to read the data in white light, the tracks will not be resolved. However, adding a red filter (or providing red illumination) eliminates the green and blue tracks, and the remaining red tracks, which are separated by the resolution limit, are resolved. Similarly, inserting green and blue filters will reveal the green and blue data tracks, respectively.

"Like" data sets light up as a single channel in whole-field illumination that is keyed to the isolating optical property of that data set, somewhat like a radio tuner being tuned to a specific channel. The more discriminating the tuner, the higher the number of channels that may be fit into the receiver bandwidth, to further the analogy. If a detector array is used, and each pixel in the array is optically keyed to a discrete channel comprising an optically isolated data set, then a plurality of channels can be read in parallel.

At present the burden of resolution in an optical data storage system is borne largely by the optical read/write head, such that higher data storage density requires shorter and shorter illumination wavelengths or larger and larger numerical apertures. In the embodiments disclosed herein, the resolution burden is shifted in large degree to the medium itself, while decreasing the optical tracking and focus servo requirements on the optical drive. However, this shifting of burden to the medium can be done at little additional economic cost because of mass production replication methods where the expensive precision is only in the master tool, and so the expense is amortized over the long product life of this tool.

The differentiated tracks may e read sequentially by a single head, where each convolved spiral is a "page," or in parallel either with multiple objectives or a single objective with a multi-channel filtered detector. If read in parallel, multi-channel encoding is possible. For writing and erasing, although the illumination spot will illuminate multiple tracks, only the track with the same color, continuing this illustration, will be affected. In near-field optical recording, tracks may be differentiated by physical height, or phase, or refractive index, such that the returning light is different for neighboring tracks. The resolution limit is defined for points of equal intensity. If there is a significant difference in intensity, points closer than the resolution limit may be resolved.

While this invention brings advantages to near-field optical data storage, track differentiation has the greatest potential impact on more traditional optical data storage, such as magneto optical and phase change, where track density can be increased by a factor of 400 times and more depending on signal-to-noise constraints. In addition, multi-channel encoding is made possible. Further, such an optically active medium with optically isolated active sites spaced more closely than the resolution limit can be seen to have application in image printing, whether of a photographic system or a printing system.

Accordingly, this invention provides for optical storage density much greater than the resolution limit of an optical system by optically isolating and differentiating or discriminating between active optical sites, where the sites are made as small as the detection limit of the optical system.

In accordance with a further feature of the invention, capability for whole-field parallel readout is provided.

In accordance with yet another feature of the invention, fast data transfer is effected.

In accordance with still another feature of the invention, there is provided removable media and optical systems with low numerical apertures and large working distances.

Additionally, there is provided surface volumetric storage and the capability for non-moving media.

Other features of the invention will be readily apparent when the following detailed description is read in connection with the drawings.

BRIEF DESCRIPTION OF THE DRAWINGS

The structure and operation of the invention, together with other objects and advantages thereof, may best be understood by reading the detailed description to follow in connection with the drawings in which unique reference numerals have been used throughout for each part and wherein.

DESCRIPTION OF THE PREFERRED EMBODIMENTS

Figure 1:
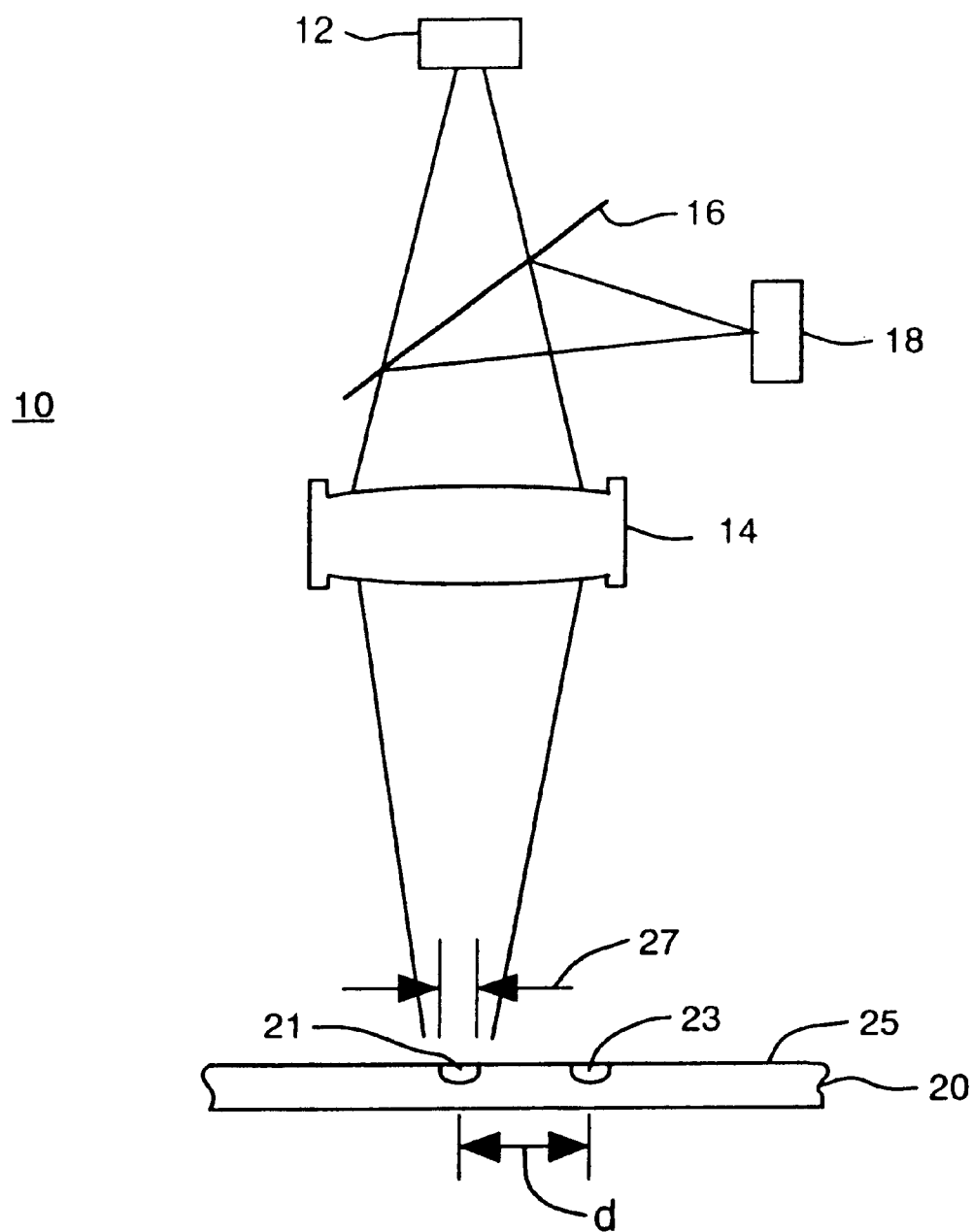
FIG. 1 is a diagrammatic elevational view of a conventional optical storage system comprising an objective lens and a medium used for data storage or retrieval.

There is shown in FIG. 1 a conventional optical storage system 10 comprising an objective lens 14, such as found in a Digital Versatile Disc (DVD) head, and a conventional recording medium 10, such as an optical or magneto-optical recording disc. Recording medium 20 typically stores data comprising optical artifacts 21 and 23 such as pits, formed at medium surface 25. Optical artifacts 21 and 23 are spaced no closer than a minimum distance of "d" to each other, as indicated, where d is approximately the resolution limit of storage system 10. An illumination source 12 provides a reading/writing spot 27 at a medium surface 25. Reading/writing spot 27 may be reflected to a detector 18 by means of a partially-reflecting mirror 16, as is well-known in the relevant art. Because optical artifacts spaced closer than the resolution limit will not be discerned, data storage density is limited by the resolution of optical storage system 10.

Figure 2:
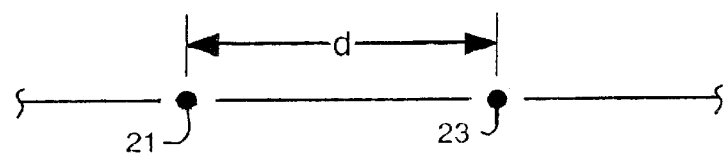
FIG. 2 is a diagrammatic representation of two optical artifacts or data sites of essentially equal intensity incoherent illumination separated by a resolution limit dimension of d, as found in the medium of FIG. 1.
Figure 3:
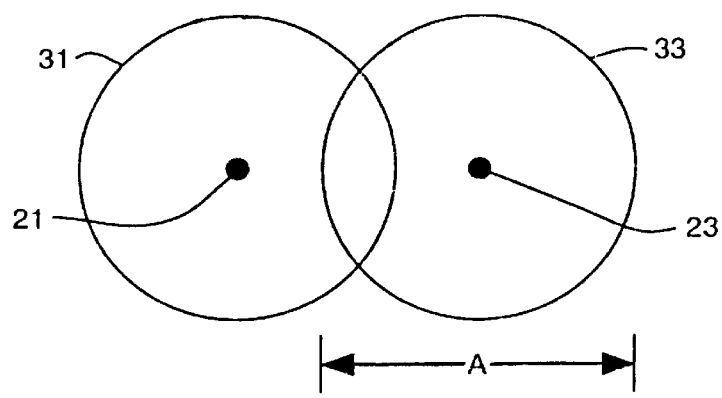
FIG. 3 shows the Airy disks associated with the optical artifacts of FIG. 2.

The theoretical basis for this limitation is most readily explained with reference to FIGS. 2 and 3 in which are shown optical artifacts 21 and 22 with corresponding Airy disks 31 and 33. (3). Optical artifacts 21 and 22 are considered to be objects having equal intensity incoherent illumination. Airy disks 31 and 33 have diameters "A" which are dimensionally equivalent to the resolution limit of optical storage system 10, in FIG. 1. It should be understood that, although higher-order diffraction rings exist, these are not shown for reasons of clarity. In optical storage systems employing coherent light sources, these higher orders add constructively to reduce resolution. Consequently coherently-illuminated optical data storage systems typically require a track separation significantly larger than the theoretical resolution limit.

Figure 4:
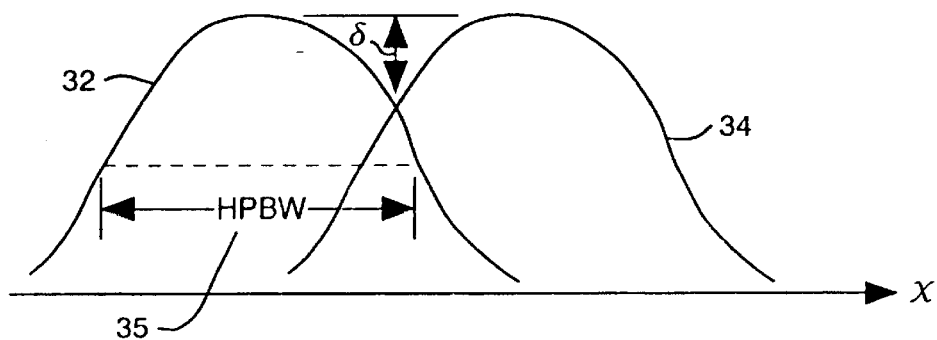
FIG. 4 shows the overlapping intensity profiles associated with the optical artifacts of FIG. 2.

In FIG. 4, showing the intensity distribution 32 and 34 of Airy disks 31 and 33 respectively, the magnitude of a dip "δ" between overlapping intensity distributions 32 and 34 determines whether the objects are resolved. The value for δ varies depending on the criteria used (e.g., Rayleigh or Sparrow criteria). To first order, if no dip is observed even in the second derivative, the objects are not resolved. Alternatively half-power beam width 35, or half width at half maximum can also be used to determine the resolution of an optical system when only one object of a known size is present. A more thorough discussion of resolution theory is provided in the cited reference by Lipson and Lipson.

Figure 5:
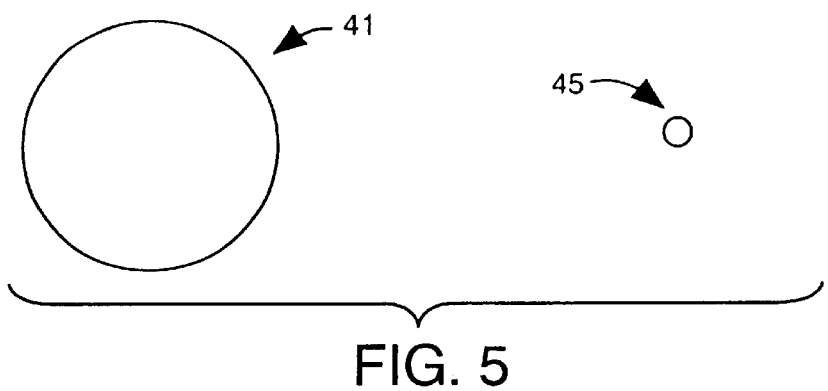
FIG. 5 is a diagrammatic representation of two optical artifacts or data sites of different size.
Figure 6:
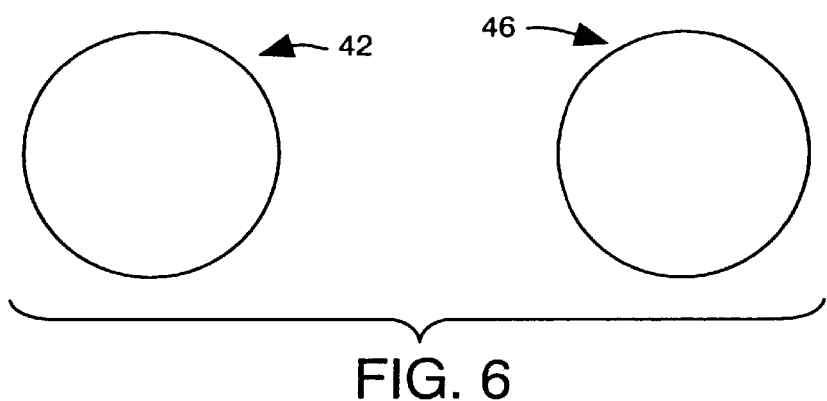
FIG. 6 shows the Airy disks associated with the optical artifacts of FIG. 5.
Figure 7:
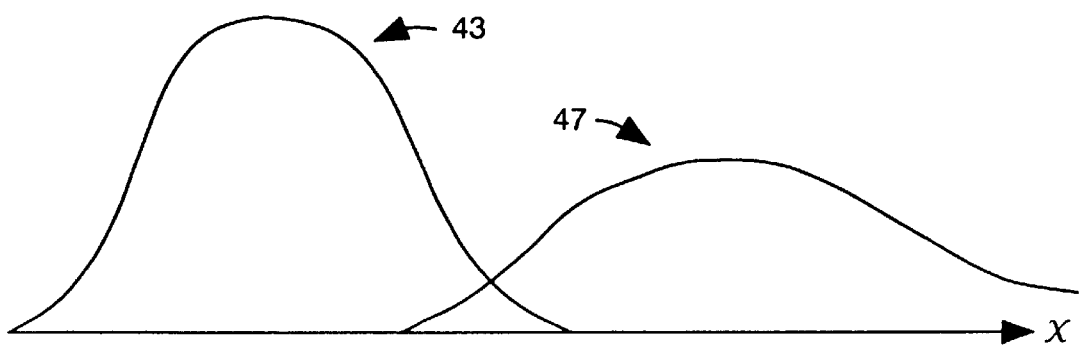
FIG. 7 shows the overlapping intensity profiles associated with the optical artifacts of FIG. 5.

FIGS. 5, 6, and 7 illustrate a condition wherein an object 41, of the same size as the resolution limit of optical system 10, is rendered as an Airy disk 42 having an intensity distribution of 43. In comparison, a smaller object 45 of a much smaller size than the resolution limit also results in an Airy disk 46 having the same diameter as Airy disk 42. For smaller object 45, however, intensity distribution 47 is proportionally lower. Given an adequate signal-to-noise ratio, very small objects can be detected by an optical system even when those objects are much smaller than the resolution limit of the detection system. As is understood by one skilled in the relevant art, intensity distributions 43 and 47 differ, increasing the corresponding resolution, and allowing for even closer spacing of the corresponding objects. This condition is used to advantage in an embodiment discussed in greater detail below.

Figure 8:
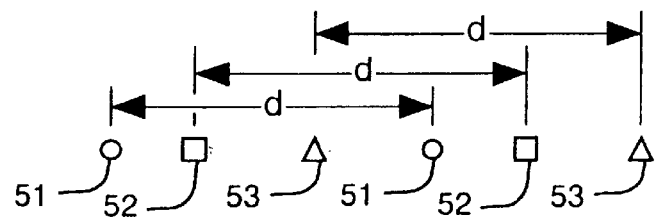
FIG. 8 is a diagrammatic representation of a plurality of dissimilar optical artifacts or data sites.

In FIG. 8 there are shown a first type of optical artifact 51 (indicated by circles), a second type of optical artifact 52 (indicated by squares), and a third type of optical artifact 53 (indicated by triangles). First optical artifact 51 is spaced at a minimum distance of d (i.e., the resolution limit of the storage system) from an adjacent first optical artifact 51. Similarly, second optical artifact 52 is spaced at a minimum distance d from an adjacent second optical artifact 52, and third optical artifact 53 is spaced at a minimum distance of d from an adjacent third optical artifact 53. Optically dissimilar artifacts (e.g., optical artifacts 51 and 52) can be spaced at less than distance d from one another.

Figure 9:
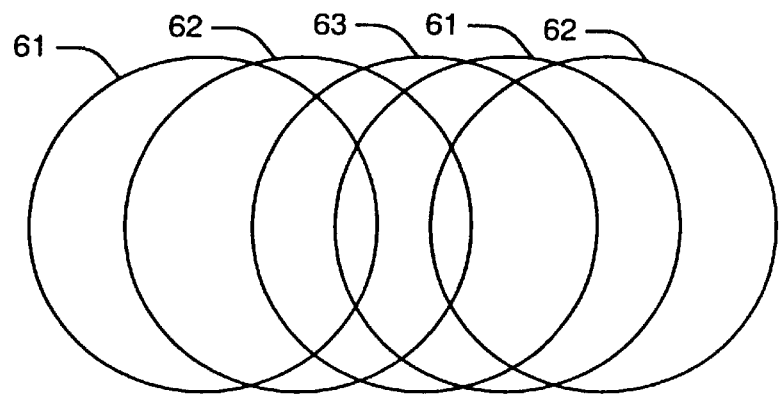
FIG. 9 shows the Airy disks associated with the optical artifacts of FIG. 8.
Figure 10:
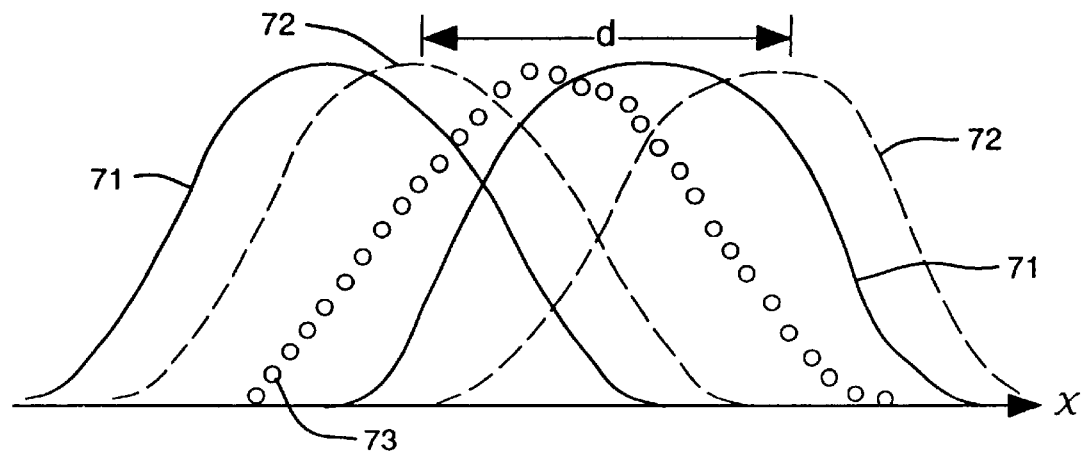
FIG. 10 shows the overlapping intensity profiles associated with the optical artifacts of FIG. 8.

Corresponding Airy disks 61, 62, and 63 are shown in FIG. 9, and corresponding intensity distributions 71, 72, and 73 are shown in FIG. 10. In a conventional storage system, optical artifacts 51, 52, and 53 would remain unresolved if they were optically similar artifacts. However, if optical artifacts 51, 52, and 53 can be optically differentiated from one another such that not all are concurrently visible, there is no effect on the resultant resolution. For example, optical artifacts 51 may be linearly polarized sites oriented parallel to similarly polarized optical system illumination, and optical artifacts 52 and 53 may be polarized at other polarization angles to the illumination. In such a configuration, optical artifacts 52 and 53 would become optically differentiated or discriminative from optical artifacts 51, and would have no effect on the resolving of optical artifacts 51. As the polarization of the illumination is changed, optical artifacts 51 are no longer detected, and either optical artifacts 52 or 53 may be detected instead. Each similar pair of optical artifacts is readily resolved if separated by at least the resolution limit d, and with optical discrimination or differentiation the resultant data density can be much higher than that available in a conventional optical storage system. By way of comparison, if optically discriminative optical artifacts of 40 Å particles are used in place of conventional 4000 Å optical artifacts, it is possible to attain an increase of two orders of magnitude in storage density for discrimination along a track width (i.e., y-density increase), to four orders of magnitude for discrimination along a track width and discrimination between tracks (i.e., x-y density increase).

Figure 11:
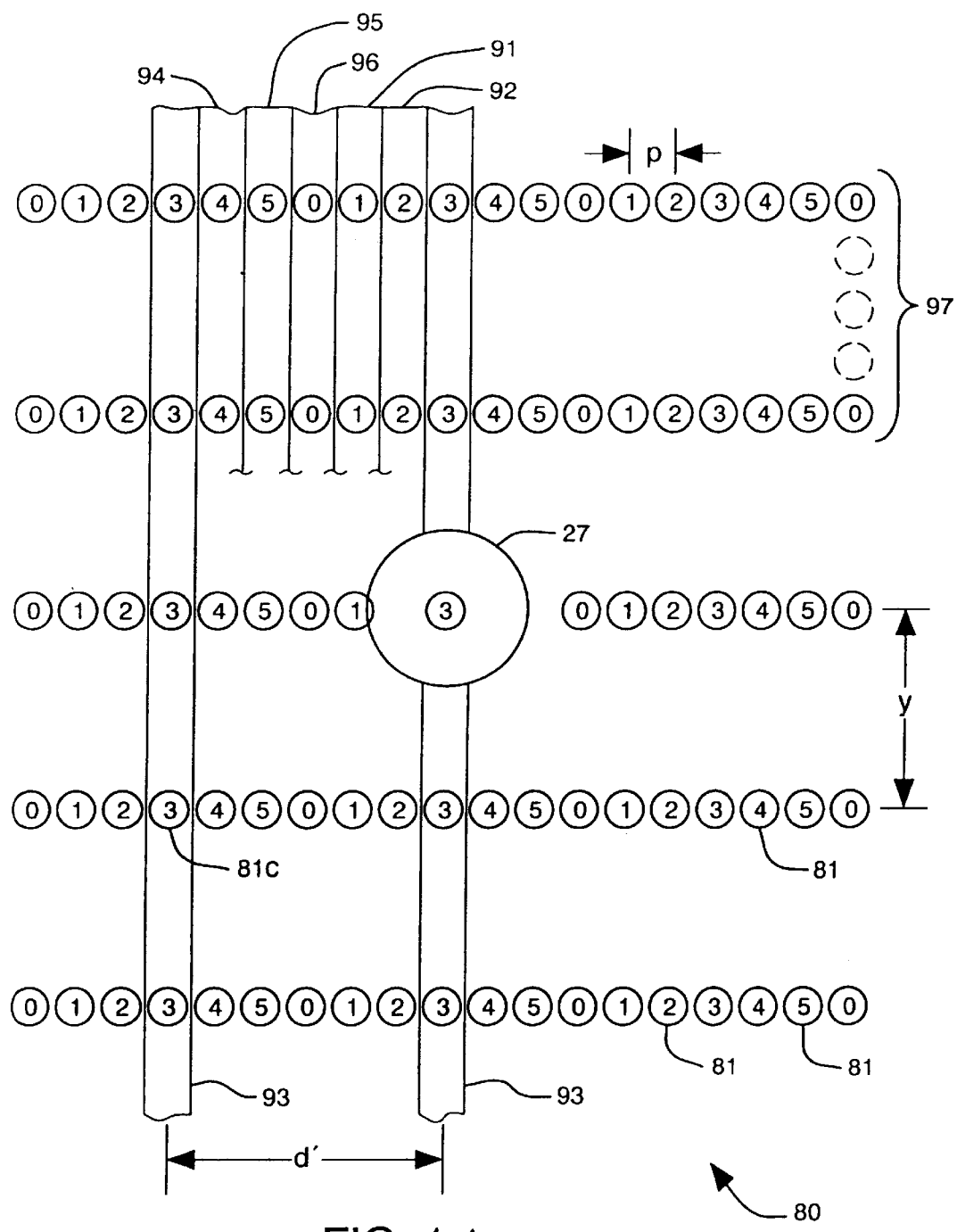
FIG. 11 shows a plurality of data sites formed in the surface of an optical storage medium as detected by a writing spot.

Referring to FIG. 11, there are shown a plurality of data sites comprising an array of optical artifacts 81 formed in the surface of an optical storage medium 80. Optical tracks 93 are comprised of similar optical artifacts 81c (designated by the numeral 3) and are spaced a distance "d'" from one another, where d' is equal to or greater than d, the resolution of the optical storage system utilizing medium 80. The approximate relative size of this resolution limit is indicated by the size of reading/writing spot 27. In the example provided, the optical storage system is detecting only optical track 93 by optically discriminating optical track 93 from optical tracks 91, 92, 94, 95, and 96. In this way, the size of each track, and the track separation distance, can be made much smaller than the resolution limit of the optical storage system. Along the track direction, data is spaced at a distance "y" for conventional resolution, or may comprise optically dissimilarly optical artifacts as indicated at 97.

Reading/writing spot 27 is larger than track separation, but only those tracks which are keyed to the optical properties of reading/writing spot 27 will react in either writing or reading data to medium 80. In an alternative embodiment, optical track center-to-center separation d' is larger than resolution limit d so as to achieve a higher signal-to-noise (SNR) ratio and contrast. Similarly, an even larger d' can be used to allow for defocus and tracking errors, thus greatly reducing demands on the optical storage system servos performing these functions.

In the example provided, the illumination of the optical system is keyed optically to optical artifacts 81c. Dissimilar optical artifacts within reading/writing spot 27 that are not optically similar to optical artifacts 81c are not detected and thus do not affect the resolution of optical artifacts 81c. For clarity, similar optical artifacts are shown as being separated in the y-axis by at least the resolution limit d, but it will be understood that the same optical differentiation or discrimination method can be applied to all axes, as indicated at 97.

Figure 12:
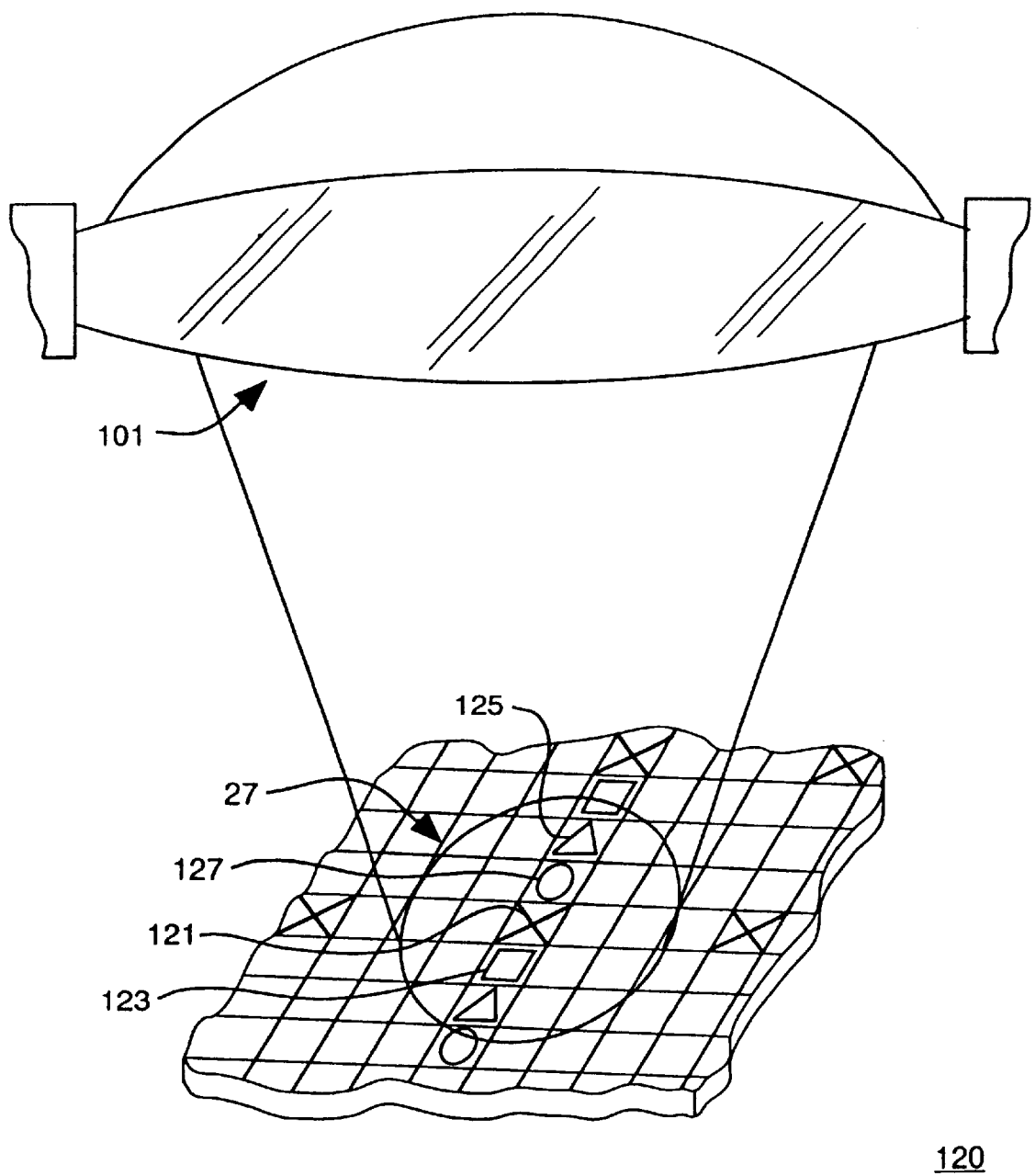
FIG. 12 is a diagrammatical perspective view of an objective lens illuminating an optical storage medium in accordance with the present invention.

FIG. 12 illustrates a perspective view of an objective lens 101 illuminating a medium 120 comprising optically-isolated predisposed optical artifacts 121 (X symbol), 123 (square symbol), 125 (triangle symbol), and 127 (circle symbol). Reading/writing spot 27 illuminates optical artifacts 121, 123, 125, and 127, but is keyed, either at the source of illumination or at the detector, to discern only optical artifact 121, while optical artifacts 123, 125, and 127 are not discerned. As discussed above, because optical artifacts 121 are separated by at least the resolution limit d, they are detected even though their dimensional size is smaller than the resolution limit.

Figure 13:
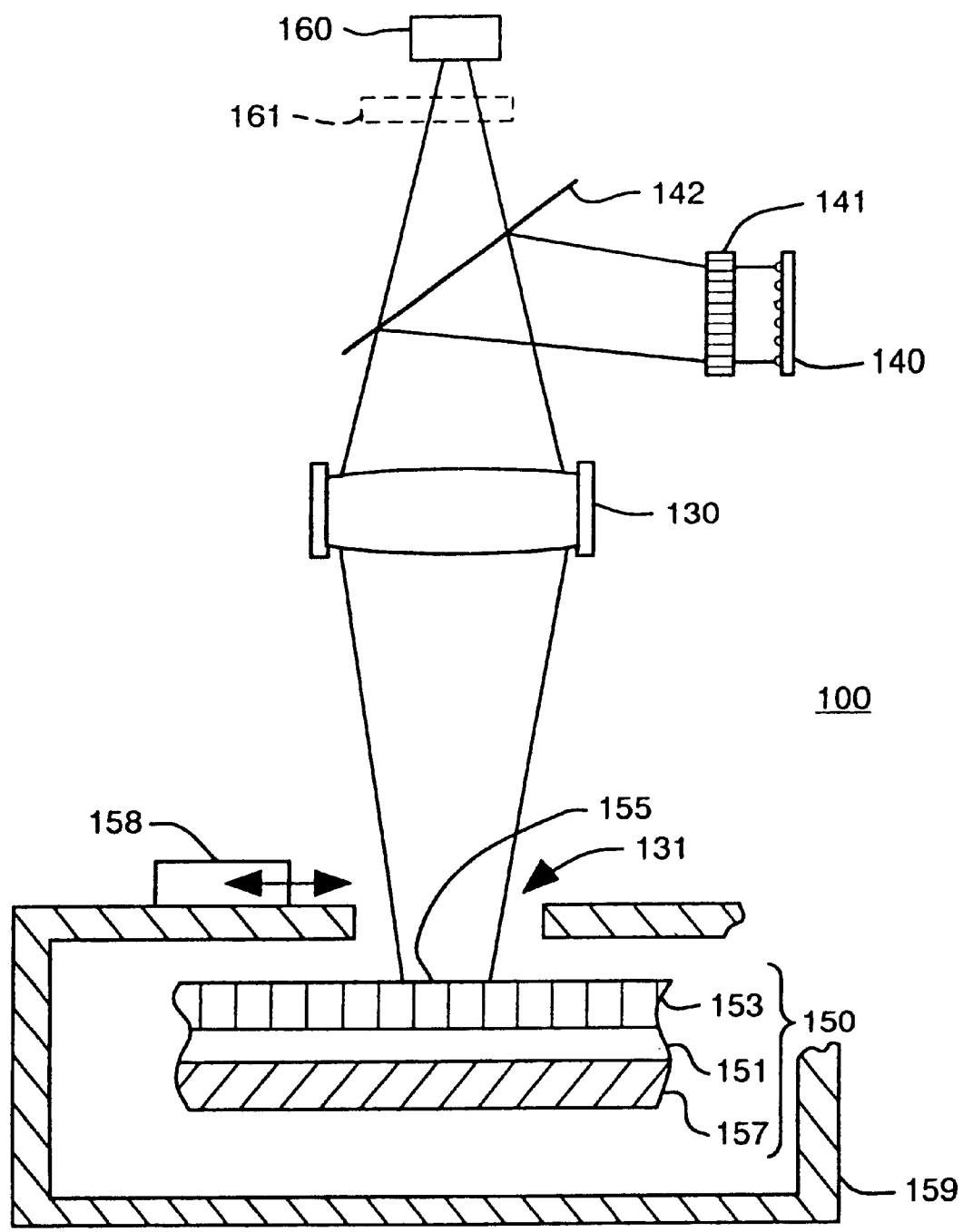
FIG. 13 is a schematic diagram of an optical data storage system comprising optical discrimination and differentiation elements in accordance with the present invention.

There is shown in FIG. 13, a schematic of an optical data storage system 100 in accordance with the present invention. Optical storage system 100 comprises an objective lens 130 providing a focal spot 131 for reading and writing, a detector 140, a beam splitter 142, and a source of illumination 160, such as a laser diode, an LED, or other suitable tunable or fixed-frequency source of optical radiation. There may be a source discriminator 161 disposed between source 160 and a medium 150. Alternatively, there may be a detection discriminator 141 disposed between medium 150 and detector 140. Discriminators 141 and 161 may comprise polarizers, phase shifters, mono-chromators, narrow-band wavelength filters, focal shifters, or aperture sets for diffraction or scatter angle. Preferably, the degree of discrimination is variable over a predetermined range, either continuously or in discrete steps, such that the corresponding optically differentiated optical artifacts in medium 150 can be selectively discriminated or isolated for purpose of reading or writing.

Medium 150 comprises an active layer 151 which is responsive to illumination source 160 such that a predetermined amount of illumination 160 impinging upon a portion of active layer 151 produces an optical artifact within a local region of active layer 151. The optical artifact so produced may be a change in index of refraction of the material comprising active layer 151, or it may be a change in scattering coefficient, in polarization, in diffraction property, in refraction, or in absorption, for example. Medium 150 may further comprise a differentiation layer 153 comprising a plurality of optical differentiation elements 155 disposed between source 160 and active layer 151, as shown, and as described in greater detail below.

Detector 140 may comprise a single device, such as a CCD pixel, or may comprise a one- or two-dimensional array of such devices, where each pixel may correspond to one or more optical differentiation elements 155. In this way, an individual pixel would receive differentiated illumination reflected from medium 150, such as optical information of a particular wavelength, phase, scatter or diffraction angle, for example. In this manner information from a plurality of tracks and data sites on medium 150 can be read and processed in parallel for enhanced data transfer speed and for other functions, such as multi-tasking or multi-track encoding.

Medium 150 may also comprise a substrate 157 which may be a flexible or rigid material, as the particular application may require. Preferably, medium 150 is enclosed in a housing 159, comprising a slidable window 158, for protection against contamination. Medium 150 may further be circular and rotated for data retrieval, or may be rectangular and scanned or traversed for data retrieval.

Figure 14:
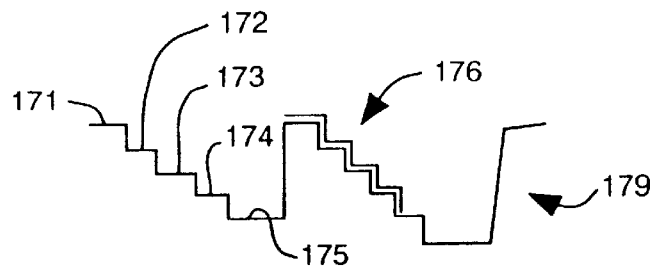
FIG. 14 illustrates differentiation of optical artifacts by means of stepped levels.

In a first embodiment of optical track discrimination, optical artifacts are differentiated geometrically, as shown schematically in FIG. 14. An active layer 177 is formed on a substrate 179 having stepped levels 171–175. Alternatively, this configuration may be accomplished by an embossing process in the active layer material. The power level of illumination returned to detector 140 from stepped levels 171–175 will vary according to the degree of focus. Because conventional active layer materials, such as phase-change materials, require a minimum incident power level to effect a detectable optical change (e.g., about 10 mW for a coherent focused laser diode source), thereby storing a data bit, only that stepped level present at the proper focus will be affected. Shifting the focus to the next stepped level allows writing on that stepped level, and so on, without affecting the other stepped levels. The step height can be established by considering the focal depth of the optical system, where a small focus depth is desirable for highest track differentiation and isolation. Similar stepped levels may be used to discriminate the optical sites by optical phase, where only one stepped level is at the correct constructive interference height for the variable phase-shifted light.

Figure 15:
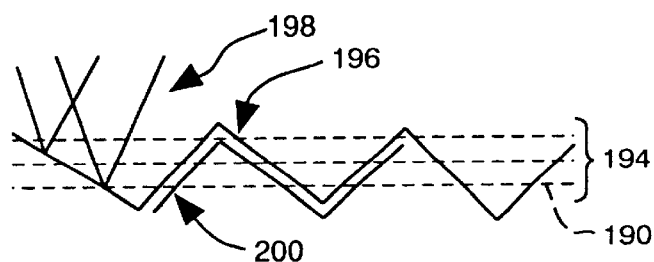
FIG. 15 illustrates optical differentiation by means of a prismatic surface.

In a second embodiment, shown in FIG. 15, the height level is continuously changed by replacing the stepped levels of FIG. 14 with a prismatic surface 190. Only a small area of a sloping prism surface 196 is in focus for either reading or writing, and so reading/writing spot 198 must be refocused to see or write data on ative layer 200 at each of the constant height planes indicated by the dashed lines at 194. The slope causes the power density of incident illumination to be of the required writing level along only a narrow section, and is reduced below this power density level everywhere else on the prism facet by defocus and depth of field.

An added benefit is realized, in that active layer 200 is illuminated with the evanescent field, or near-field, prismatic surface 190 is illuminated from above so as to cause total internal reflection at prism surface 196. Moreover, this internal reflection condition increases contrast even with propagating light, because it is essentially dark-field, in that specular from ECD is not returned in this oblique geometry. A circular polarizer comprising a linear polarizer and a phase retarder (not shown) reduces specular reflection from a planar medium surface in normal incidence illumination. The centroid of the power in a Gaussian beam shifts relative to the geometric beam center in total internal reflection (TIR), and this affects writing location because of the placement of highest power density (i.e., the data track will be offset from the geometrical center of beam). Preferably, the source power level will be constant and signal mode, because a power shift may also result in lateral and vertical geometrical shift which causes running into other tracks on the sloped surface.

Such stepped levels and prismatic surfaces, as well as other geometric configurations described below, can be mastered by precision diamond machining on a diamond turning lathe, or may be formed by photo-lithographic means. Holographic techniques have been described in the patent literatures for forming such structures in three dimensions by using multiple laser beam interference. Substrates are then formed by compression/injection molding or embossing to these masters.

It is important to note that these geometrically-optically isolated structures, as well as all of the means for optical isolation and discrimination described herein, also have the advantage of whole-field parallel optical detection and writing. For example, here at the equal-level, equal-focus spots in all of the prisms can be seen at once and read out simultaneously by a detector array, for greatly enhanced data transfer rates. In such applications, a $\lambda/6$ criterion may be used to reduce crosstalk in land and groove systems is applied to such sloped surfaces, and a 0.1 micron track spacing is achieved with a DVD laser source wavelength of 0.650 micron.

Figure 16:
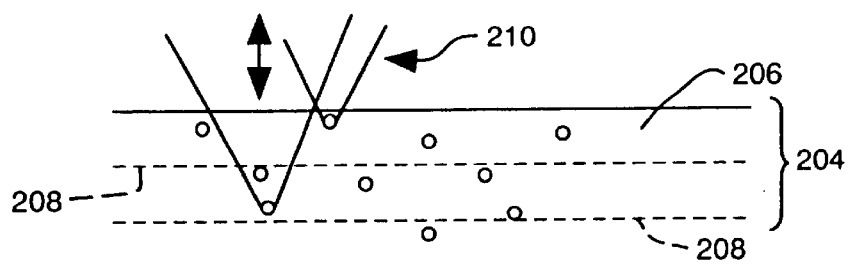
FIG. 16 illustrates optical differentiation accomplished by means of vertically-dispersed layers formed in the active layer of the optical storage medium.

If the active layer comprises a phase-change material, the preferred mechanism for optical discrimination and detection is scatter. In this internal reflection mode, it is the backscatter that is detected rather than the forward. However, both have the same high spatial frequency information, so the effective numerical aperture is quite high. In FIG. 16, a vertical optical isolation similar to those in FIGS. 14 and 15 is achieved either by means of an active layer 204 into which sites 206 are written by, for example, ablation and void creation, or by writing into layers dispersed vertically within active layer 204, as indicated by dashed line planes 208. Both of these volumetric approaches to optical data storage are enhanced by the optical isolation provided by shifting of the focus 210 of the illumination vertically, such that sites may be placed laterally at much closer spacing than the resolution limit of the optical system. Further optical isolation may be gained by varying the optical index of the written sites within the volume, with, for example, different power levels during writing or different writing duration times at each site. Such an optical differentiation would be extremely sensitive when used with total internal reflection and a critical angle "valve" technique (i.e., an aperture rejection device). Many more materials would become viable active optical layers in this case, with the result of lower cost media, where the substrate itself is the active optical medium. Similarly, the size of the sites may be carried in order to cause optical isolation by scatter angle, optical resonance with wavelength tuning (e.g., selective scatter or "photonic bandpass crystals") or the material layers at planes 208 throughout the volume may be of different materials and have different absorption or polarization.

Figure 17:
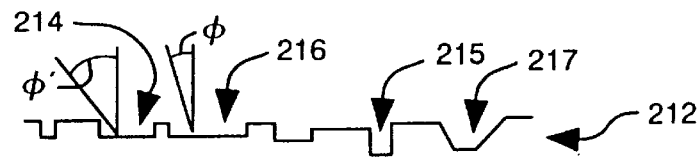
FIG. 17 illustrates optical isolation suitable for scatter or diffraction differentiation by means of data sites of varying width, depth, or slope.
Figure 18:
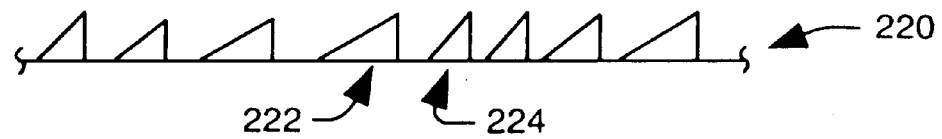
FIG. 18 illustrates optical isolation or differentiation by means of discrete slope differences.
Figure 19:
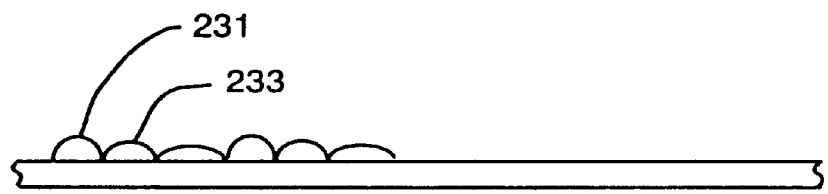
FIG. 19 illustrates optical isolation or differentiation by means of lenticulars or lenslets disposed over data sites.

FIGS. 17, 18, and 19 depict geometric embodiments in which the optical isolation is in the form of differentiated scatter or diffraction angle from the optical artifacts, or differentiated scatter or diffraction efficiency (i.e., an intensity detection). For example, in FIG. 18, the isolating optical surface 212 shows a number of ways of affecting the scatter or diffraction angle or efficiency, as with site width as shown at 214 and 216, site depth as in 215, or site slope, as in 217. In particular, the scatter angle is indicated for 214 to be smaller than for site 216, such that an aperture placed at the detector (not shown) would reject one and accept the other. Preferably, detector array 141 is used (as in FIG. 13), where each pixel in detector array 141 receives the diffracted or scattered light from a particular isolated track. In FIG. 18, an optical differentiation layer 220 is based on discrete slope differences between sites, as indicated at 222 and 224. As shown in FIG. 19, lenticulars 231 and 233 of different curvature and focal length serve to discriminate between the optical sites. In the embodiments of FIGS. 17 and 18, the active optical layer may be deposited onto the isolation geometry by vacuum methods, for example, or the isolation geometry and differentiation layer may be embossed or molded into the active optical layer.

Figure 20:
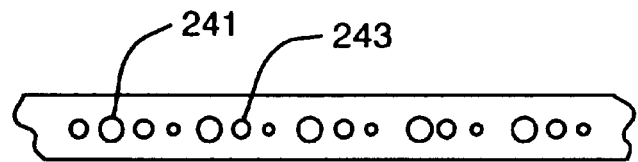
FIG. 20 shows a geometric optical differentiation comprising an emulsion of spheres of different sizes.

FIG. 20 shows a geometric optical isolation comprising an emulsion of spheres 241 and 243 having different diameters, that are either deposited upon the active optical layer, or are themselves the active optical layer. Depending on the size range of these spheres relative to the illumination, the optical isolation can be one of interference, as in the opalescent colors seen in opals, or scatter angle, or even optical wave-length-dependent resonance.

Figure 21:
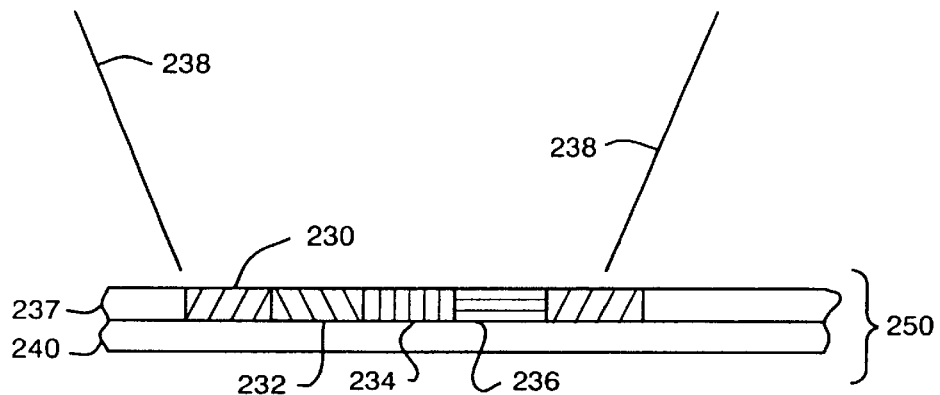
FIG. 21 is a sectional diagram of an optical data storage system comprising an active layer and an optical differentiation layer.

In FIG. 21, a section drawing of an optical data storage medium 250 is shown comprising an optical differentiation layer 237 adjacent to a homogeneous active layer 240. The illumination reading/writing spot 238 is shown such that it is keyed optically, as indicated by the vertical line symbol, to an optically-similar optical differentiation element 234, while optically-dissimilar optical differentiation elements 230, 232, and 236 prevent or block the illumination from writing to or reading from the underlying region of active layer 240 below isolation element 234 can be written on or read from. Optical differentiation elements 234 may comprise polarizers of different rotation angles as in a magneto-optical application, for example, or may comprise narrow bandpass filters, absorbers, or variations in refractive index.

Figure 22:
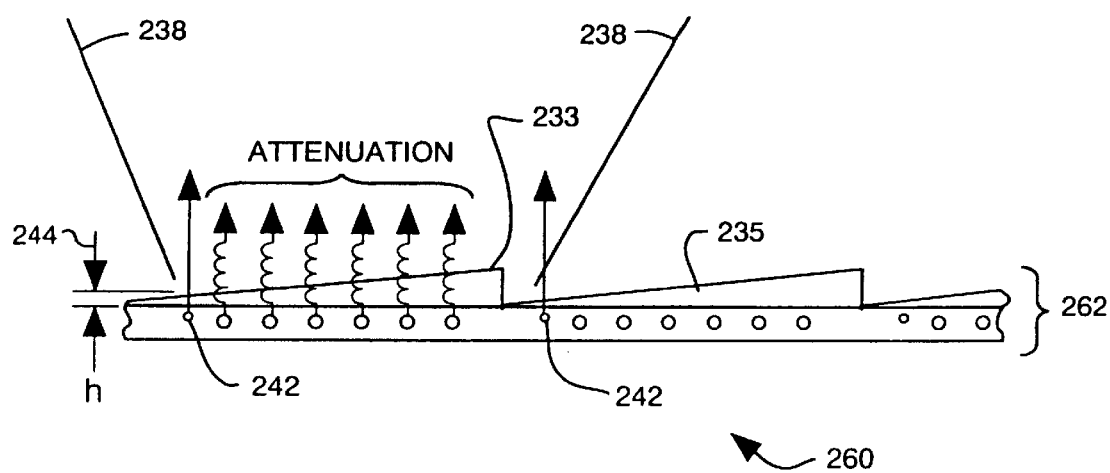
FIG. 22 is a sectional diagram of an optical data storage system comprising an active layer and optical differentiating wedge elements; and, FIG. 23 is a section drawing of an optical medium in which an active layer comprises optically isolated sites.

In FIG. 22, there is shown an optical storage and retrieval medium 260 comprising a homogeneous active layer 240, such as a phase-change material, with an adjacent optical differentiation layer 262 comprising wedges 233 and 235. Wedges 233 and 235 have a lateral dimension that is at least as large as the resolution limit of the optical system, as indicated by the focus spot 238. Wedges 233 and 235 may be used to continuously vary the phase along the length of the wedge, or may act as a continuously varying intererfero-metric filter. In the former case, the light entering wedge 233 or 235 is shifted in phase by an amount equal to twice the optical thickness of the wedge at the point of entry (i.e. the product of the physical height "h" of the wedge at that point and the index of refraction n of the wedge material). An optical storage system utilizing medium 260 would comprise a polarizer and analyzer disposed between the source of optical radiation and the detector. Preferably, the analyzer would be a variable unit, such that polarized light is accepted after wedge 233 or 235 has rotated the polarization angle (and converted from linear to circular), and optical radiation of other polarizations is not accepted.

In the interferometry configuration, wedges 233 and 235 act as local interference filters, where when the optical thickness "nh" at the optical entry point is $\lambda/4$, destructive interference occurs for that wavelength, while constructive interference occurs for that wavelength, while constructive interference occurs for points at which the optical thickness is $\lambda/2$. An optical storage system utilizing medium 260 in an interferometry configuration would further comprise a tunable-wavelength source of optical illumination or, alternatively, that a tunable monochromator is disposed either at the source of illumination or at the detector. In either the phase or wavelength case, depending on the monochromatic or phase resolution of the tunable source of illumination, very high optical isolation and storage density may be obtained over only one interferometric order. In this case, the wedge can be very large laterally, and for some applications may be a single wedge of large lateral dimension.

"Like" sites n(nh) 242 are written to or read from the active optical layer at the similar part of wedges 233 and 235, but they are spaced at least at the resolution limit. The optical isolation or differentiation occurs because of the continuous variation in the height "h" (indicated at 144) at each point along wedge 233. This variation in height can be used for isolation by interference, where the source of illumination or the detector is optically keyed for a single or narrow-band wavelength. The wedges in this case are comprised of a dielectric material. If the illumination is near-field, the wedges may be metallic, such that the surface plasmon resonance absorption is tuned to a specific wavelength that changes along the length of the wedge element. The advantage in this embodiment is that the elements are relatively large and easier to produce in a manufacturing environment, while the isolation is quire strong. Further, the number of isolation points within one wedge element is essentially infinite, which in practice means that as the optical drive selectivity or "tuning" improves, the same medium can provide the required resolution. In white light, each of these wedge elements would present to the eye a spectrum of color from black to white, over which interference causes strong saturated colors, as in an oil slick. Therefore, tuning the writing or reading to a particular wavelength will allow only a small area along the wedge to be written or read.

The total height of each wedge element is such that, preferably, only first order interference occurs for the full spectrum over the length of the wedge. However, optical wedges may be used which have a total height such that multiple interference orders are allowed, if the optical elements have the required wavelength resolution, or if they further include phase shifting means such as a liquid crystal phase shifter. In either case, in effect, micro-interferometers are integrated into the optical storage media. Where the optical active material changes from a scatterer to a specular surface, as in phase change materials, the scatter will make the optical isolation less effective, especially in the case of sensing polarization shift or wavelength interference. It may be desirable, then, to write specular amorphous sites rather than scattering crystalline sites.

The wedges may be embossed or molded into a plastic, which is then coated with the active optical layer. Alternately, for such a small thickness variation, the wedges may be applied onto the active optical layer in a vacuum deposition process, where the wedge is obtained by sloped positioning relative to the material ejection source, or a prodimal aperture mask is moved over the media in real-time, as the coating of the dielectric, or in the plasmon case, metal material is deposited.

It is important to note that for any of the embodiments described above, there may be additional optical layers disposed between the active and optical differentiation layers, such as for near-field diffraction, plasmon resonance field, or optical resonance applications, and there may be additional layers disposed upon the differentiation layer, such as diamond-like carbon (DLC) or $TiO_2$, for protection of the media surface from abrasion and the environment.

Figure 23:
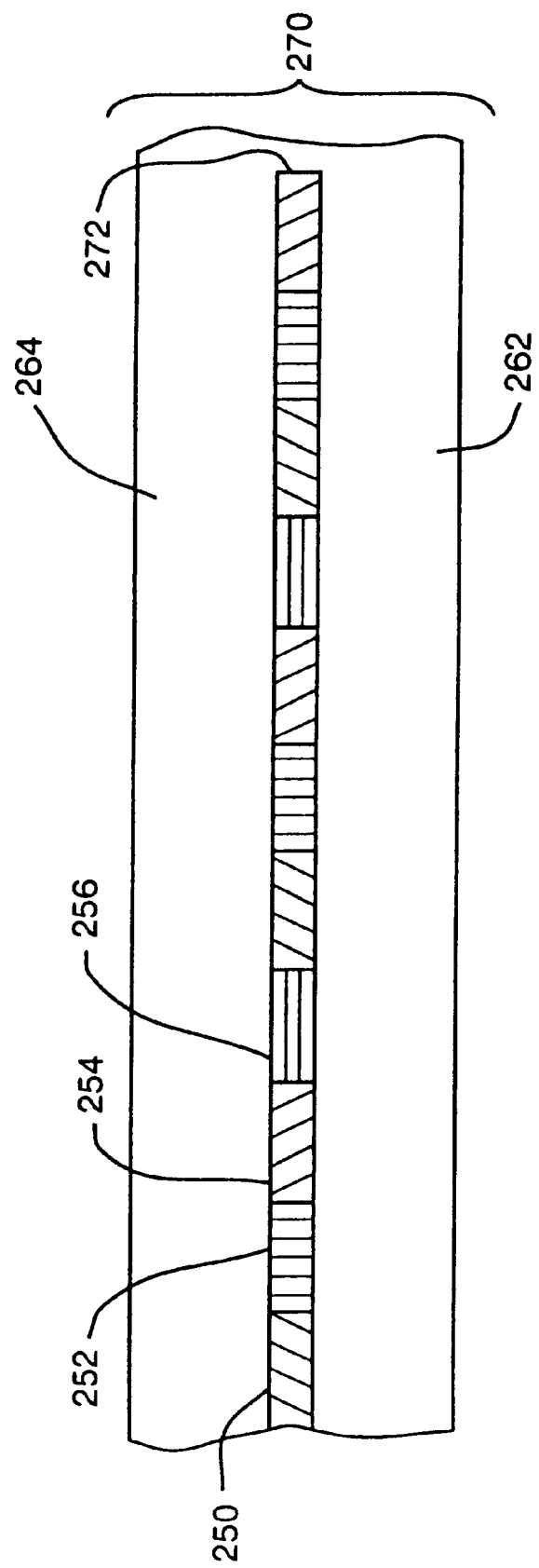

FIG. 23 provides a section drawing of an optical medium 270 in which an active layer 272 comprises optically isolated sites 250–256. In contrast to the homogenous active layers in the above embodiments, active layer 272 comprises adjacent sites 250–256 which are "islands" of different materials. These different materials may comprise materials of a different crystallite size, chemical makeup, fluorescent excitation, optical absorption, or scatter and diffraction properties, for example. With separate crystallites, there is less likelihood of thermal bleeding into the neighboring crystallites, as can be a problem with materials such as phase change at present. Crystallite size in phase change materials have been reported as small as 20 nanometeres in diameter. A composite mixture of many materials with small crystallites can be used, each material responding to power level, polarization, wavelength, or other. This composite or conglomerate may be formed by co-evaporating or co-sputtering several materials together in a vacuum chamber, for example, or may be a glass-ceramic composition. The composite may also be a multiple element copolymer with different optical properties, such that optical isolation occurs on a polymer molecular level.

Multiple phase glasses such as pyrex (two phase) and glass ceramics can have phase separations as small as 50 Å. Such materials are made from non-miscible liquids that when cooled from the melt stage can have very finely dispersed phases. Many such materials are available and are published in such references as Musikant. Typically such materials are amorphous upon cooling, but then local heating such as with a writing laser spot will create local crystallites that nucleate around a nucleating agent, such as $TiO_2$, in the mix, and grow. As with chalcogenide phase change optical data storage materials, these crystallites can be used to store information because they scatter the light differently than the amorphous matrix. Even crystalline materials such as crystalline silica can be polymorphic, exhibiting many different crystal forms that can be locally changed with illumination from the writing laser spot to affect a change in optical properties which can later be read out as information. Such materials are preferably applied with a chemical vapor deposition CVD technique.

Alternately, a contact aperture mask method may be employed, where each material type is evaporated onto a medium substrate 262 through a blocking contact aperture mask as in micro-electronic wafer production. The mask is shifted over by one track width for each of the next depositions of the different materials. Other more esoteric possibilities for the active isolated optical layer exist. For example, crystal planes or a differentially doped matrix may provide the required high density spacing, however cost of production may be prohibitive. In any of the above embodiments, every nth track may be dedicated for use in tracking servo control as needed. For a more robust tracking application, the sites in the servo track can be much larger than the data sites.

Further spacing the like sites at greater than the resolution limit results in no loss in storage density if more differentiated sites are interposed, while making the optical data storage system much less sensitive to focus error and less sensitive to tracking error, for a more robust, faster, and lower-cost system. Isolating the active optical sites optically also, in most of the above embodiments, also isolates the sites thermally. Therefore, writing time can be much faster because there is less material to "turn" in any given site: the crystallites, for example, in the conglomerate, are much smaller than in a conventional optical media. Further, there is less likelihood of bleed-over, or cross-talk, between adjacent optical sites.

Typically, smaller writing spots are achieved (after wavelength and numerical aperture have been optimized) by writing with the beam "tip," by writing with high power short pluses. However, this is a very unstable, fluctuating part of the beam, which results in reduced signal-to-noise (SNR). With the optical isolation method, the full width writing spot may be used, for much higher stability, SNR, and lower powers.

The active optical layer may comprise a phase change material such as a chalcogenide compound, or a magneto-optical (MO) material, or other such as photo-refractive polymers, dye absorbing materials, laser ablation surfaces and volumes, photoresist, photographic emulsions, fluorescently active materials. Further, the medium may be read-only, writable, or rewritable. The medium may also be optical storage tape, for example. Many of these optical isolation structures, such as the wedges in FIG. 22, would be more easily formed, as by vacuum deposition, in the one dimensional format required by tape, especially in the case where only one wedge is required. Tape systems tend to be large and costly, and so the high resolution tunable laser source would fit well with this embodiment.

While the invention has been described with reference to particular embodiments, it will be understood that the present invention is by no means limited to the particular constructions and methods herein disclosed and/or shown in the drawings, but also comprises any modifications or equivalents within the scope of the claims.

What is claimed is:

1. An optical storage and retrieval medium for use in an optical system having a resolution limit, the medium comprising:
    an optical differentiation layer comprising at least a wedge having a lateral dimension that is at least as large as the resolution limit of the optical system and a physical height continuously varying at points along said lateral dimension such that said wedge functions as an optical discriminator at said points; and
    an active layer adjacent said optical differentiation layer, said active layer having storage locations associated with said points.

2. The optical storage and retrieval medium as in claim 1 including an optical layer disposed between said active layer and said differentiation layer.

3. The optical storage and retrieval medium as in claim 2 wherein said optical layer is adapted for a plasmon resonance field.

4. The optical storage and retrieval medium as in claim 2 wherein said optical layer is adapted for optical resonance applications.

5. The optical storage and retrieval medium as in claim 1 where said active layer comprises at least one of the following materials: phase change material, chalcogenide compound, magneto-optical material, photo-refractive polymers, dye absorbing materials, laser ablation surfaces and volumes, photoresist, photographic emulsions, or fluorescently active materials.

6. The optical storage and retrieval medium as in claim 1 or 2 further including a layer disposed upon said optical differentiation layer for protecting the surface of the medium.

7. The optical storage and retrieval medium as is claim 1 where said optical differentiation layer is formed by vacuum deposition.

8. The optical storage and retrieval medium as is claim 1 where said optical differentiation layer is formed by embossing or molding into a plastic.

9. An optical storage and retrieval medium for use in an optical system having a resolution limit and employing incident illumination for retrieval, the medium comprising:
    an optical differentiation layer comprising at least a wedge having a lateral dimension that is at least as large as the resolution limit of the optical system, an index of refraction and a physical height continuously varying at points along said lateral dimension such that incident illumination entering said points is phase shifted by an amount that is a function of said physical height and said index of refraction and said wedge functions as an optical differentiator at said points; and
    an active layer adjacent said optical differentiation layer, said active layer having storage locations associated with said points.

10. The optical storage and retrieval medium as in claim 9 including an optical layer disposed between said active layer and said differentiation layer.

11. The optical storage and retrieval medium as in claim 10 wherein said optical layer is adapted for a plasmon resonance field.

12. The optical storage and retrieval medium as in claim 10 wherein said optical layer is adapted for optical resonance applications.

13. The optical storage and retrieval medium as in claim 9 where said active layer comprises at least one of the following materials: phase change material, chalcogenide compound, magneto-optical material, photo-refractive polymers, dye absorbing materials, laser ablation surfaces and volumes, photoresist, photographic emulsions, or fluorescently active materials.

14. The optical storage and retrieval medium as is claim 9 where said optical differentiation layer is formed by vacuum deposition.

15. The optical storage and retrieval medium as is claim 9 where said optical differentiation layer is formed by embossing or molding into a plastic.

16. The optical storage and retrieval medium as in claim 9 or 10 further including a layer disposed upon said optical differentiation layer for protecting the surface of the medium.

17. An optical storage and retrieval medium for use in an optical system having a resolution limit, the medium comprising:
    an optical differentiation layer comprising at least a wedge having a lateral dimension that is at least as large as the resolution limit of the optical system, an index of refraction and a physical height continuously varying at points along said lateral dimension such that said wedge functions as an interferometric filter and said points are optically isolated; and
    an active layer adjacent said optical differentiation layer, said active layer having storage locations associated with said points.

18. The optical storage and retrieval medium as in claim 17 including an optical layer disposed between said active layer and said differentiation layer.

19. The optical storage and retrieval medium as in claim 18 wherein said optical layer is adapted for a plasmon resonance field.

20. The optical storage and retrieval medium as in claim 18 wherein said optical layer is adapted for optical resonance applications.

21. The optical storage and retrieval medium as in claim 17 where said active layer comprises at least one of the following materials: phase change material, chalcogenide compound, magneto-optical material, photo-refractive polymers, dye absorbing materials, laser ablation surfaces and volumes, photoresist, photographic emulsions, or fluorescently active materials.

22. The optical storage and retrieval medium as is claim 17 where said optical differentiation layer is formed by vacuum deposition.

23. The optical storage and retrieval medium as is claim 17 where said optical differentiation layer is formed by embossing or molding into a plastic.

24. The optical storage and retrieval medium as in claim 17 or 18 further including a layer disposed upon said optical differentiation layer for protecting the surface of the medium.

25. The optical storage and retrieval medium as in claim 17 where the medium is configured as an optical storage tape.

26. An optical retrieval system having a resolution limit, the system comprising:

an illumination source producing a beam;

a polarizer through which said beam passes;

a medium receiving said beam from said polarizer, said medium comprising:

an optical differentiation layer comprising at least a wedge having a lateral dimension that is at least as large as the resolution limit of the optical system, an index of refraction and a physical height continuously varying at points along said lateral dimension such that said beam entering said points is phase shifted by an amount that is a function of said physical height and said index of refraction and said wedge functions as an optical differentiator at said points; and an active layer adjacent said optical differentiation layer, said active layer having storage locations associated with said points;

an analyzer receiving said beam from said medium, said analyzer accepting a selected polarization of said beam; and a detector for detecting said selected polarization.

27. The optical retrieval system as in claim 26 including an optical layer disposed between said active layer and said differentiation layer.

28. The optical retrieval system as in claim 27 wherein said optical layer is adapted for a plasmon resonance field.

29. The optical retrieval system as in claim 27 wherein said optical layer is adapted for optical resonance applications.

30. The optical storage and retrieval medium as in claim 26 where said active layer comprises at least one of the following materials: phase change material, chalcogenide compound, magneto-optical material, photo-refractive polymers, dye absorbing materials, laser ablation surfaces and volumes, photoresist, photographic emulsions, or fluorescently active materials.

31. The optical storage and retrieval medium as is claim 26 where said optical differentiation layer is formed by vacuum deposition.

32. The optical storage and retrieval medium as is claim 26 where said optical differentiation layer is formed by embossing or molding into a plastic.

33. The optical retrieval system as in claim 26 or 27 further including a layer disposed upon said optical differentiation layer for protecting the surface of the medium.

34. An optical storage and retrieval system having a resolution limit, the system comprising:

a tunable illumination source providing a tuned beam;

a medium receiving said tuned beam, said medium comprising:

an optical differentiation layer comprising at least a wedge having a lateral dimension that is at least as large as the resolution limit of the optical system, an index of refraction and a physical height continuously varying at points along said lateral dimension such that said wedge functions as an interferometric filter and said points are optically isolated; and an active layer adjacent said optical differentiation layer, said active layer having storage locations associated with said points; and a detector for detecting said beam from said medium.

35. The optical retrieval system as in claim 34 including an optical layer disposed between said active layer and said differentiation layer.

36. The optical retrieval system as in claim 35 wherein said optical layer is adapted for a plasmon resonance field.

37. The optical retrieval system as in claim 35 wherein said optical layer is adapted for optical resonance applications.

38. The optical storage and retrieval medium as in claim 34 where said active layer comprises at least one of the following materials: phase change material, chalcogenide compound, magneto-optical material, photo-refractive polymers, dye absorbing materials, laser ablation surfaces and volumes, photoresist, photographic emulsions, or fluorescently active materials.

39. The optical storage and retrieval medium as is claim 34 where said optical differentiation layer is formed by vacuum deposition.

40. The optical storage and retrieval medium as is claim 34 where said optical differentiation layer is formed by embossing or molding into a plastic.

41. The optical retrieval system as in claim 34 or 35 further including a layer disposed upon said optical differentiation layer for protecting the surface of the medium.

42. The optical storage and retrieval medium as in claim 34 where the medium is configured as an optical storage tape.

* * * * *

UNITED STATES PATENT AND TRADEMARK OFFICE
CERTIFICATE OF CORRECTION

PATENT NO.     : 6,249,507 B1
DATED          : June 19, 2001
INVENTOR(S)    : John M. Guerra It is certified that error appears in the above-identified patent and that said Letters Patent is hereby corrected as shown below:

<u>Column 1,</u>
Line 1, please add the following:

This invention was made with United States Government support by the U.S. Department of Commerce through the NSIC/MORE program under cooperative agreement number 70NANB7H3054. The United States Government has certain rights in this invention.

Signed and Sealed this

Eleventh Day of June, 2002

Attest:

Attesting Officer

JAMES E. ROGAN
*Director of the United States Patent and Trademark Office*